Patented Jan. 10, 1928.

1,655,677

UNITED STATES PATENT OFFICE.

WILLIAM ALEXANDER DICKIE AND JAMES HENRY ROONEY, OF SPONDON, NEAR DERBY, ENGLAND, ASSIGNORS TO CELANESE CORPORATION OF AMERICA, A CORPORATION OF DELAWARE.

MANUFACTURE OF PRODUCTS HAVING A BASIS OF CELLULOSE DERIVATIVES.

No Drawing. Application filed November 21, 1925, Serial No. 70,705, and in Great Britain December 10, 1924.

This invention relates to a new process for the manufacture of patterned or effect materials, sheets, slabs, blocks or other articles or objects of any shape in materials having a basis of cellulose acetate, nitrocellulose, ethyl, methyl or benzyl cellulose or other plasticizable esters or ethers of cellulose mixed or associated with a plasticizing agent or agents, with or without other additions. Patterned or effect materials, articles or objects are those which present in their substance any desired patterns, designs or effects, for instance coloured or other imitations such as tortoiseshell, marbling or veining, or ornamental designs, patterns and so forth of any colour or colours. The invention concerns processes of the kind in which the materials, articles or objects are made by subjecting to moulding under heat and pressure moulding powders consisting of or containing cellulose acetate, nitrocellulose or other plasticizable esters or ethers of cellulose (or two or more of such cellulose derivatives) mixed or associated with a plasticizing agent or agents, with or without other ingredients.

According to the present invention we employ as a means for producing patterns or effects in or upon the materials, articles or objects,—knitted, woven or other fabrics composed of yarns or threads consisting of filaments or fibres of cellulose acetate or other cellulose derivatives referred to. Such fabrics are printed, stencilled, dyed or coloured suitably for the pattern or effect to be produced, and are placed in or upon the moulding powder and subjected together therewith to the moulding under heat and pressure. The said fabrics are preferably coated or impregnated with or otherwise contain a plasticizing agent or agents, by preference such as are plasticizing agents for both the basic material of the moulding powder and that of the fabric.

In the moulding operation the fabric melts or coalesces with the fused mass formed by the moulding powder, so that its structure disappears in the moulded material or article, while leaving the coloured effect, pattern or design therein or thereon.

By this means we have found that materials, articles or objects can be very reliably produced with patterns, designs or effects of any desired character, while avoiding or greatly reducing the disadvantages previously encountered in the manufacture of patterned or effect materials or articles from moulding powders such as those referred to. Such difficulties as the liability of the pattern or design to run or blur under the effect of the heat and pressure required to cause the moulding powder to flow and condense to a homogeneous mass in the moulding operation, and the liability to produce too brittle and non-homogenous products are thus overcome.

In carrying out the invention, the fabric may be employed in a single piece or in any desired number and arrangement of pieces according to the pattern, design or effect to be produced in the material or article. For instance layers or pieces of the fabric may be disposed alternately with layers of the moulding powder, or a single layer or piece of the fabric may be interposed between layers of the moulding powder. Where desired the fabric may be disposed on a layer of the moulding powder or be spread with a covering thereof, or any number of pieces of the fabric may be arranged in any desired order and position relatively to each other in the moulding powder. Any other appropriate arrangement may be adopted according to the pattern, design or effect desired.

The fabric may be printed, stencilled, dyed or coloured in any manner suitable for the production of any desired pattern, design, device or effect. In some cases one may even employ a fabric dyed or printed in a uniform colour, so as to produce a corresponding pattern of this colour on the material or article on the coalescing of the fabric with the material in the moulding operation.

As before stated, the fabric is preferably coated or impregnated with or otherwise contains a plasticizing agent or agents, by preference such as are plasticizing agents for both the basic material of the moulding powder and for the material of the fabric. We may apply the plasticizing agent or agents in any known or suitable manner to the fabric or to the threads composing it, or we may employ a fabric woven, knitted or otherwise formed from threads of filaments of fibres of cellulose acetate or other cellulose derivatives referred to, already containing the plasticizing agent or agents. Conveniently we may soak a woven, knitted or other fabric of cellulose acetate or other cellulose derivatives referred to in a solution comprising any known or suitable plasticizing agent thereof, dissolved in a solvent which is a non-solvent for the fabric.

The design, pattern or coloration may be applied to the aforesaid fabrics in any known or suitable way, for example by printing, stencilling, "spot dyeing", ordinary dyeing or in any other suitable way. The pattern, design or coloration may be applied to the fabric before or after the application thereto of a plasticizing agent or agents as referred to.

Preferably the fabrics employed according to the invention are woven from threads or yarns composed of the same basic material as that forming the basis of the moulding powder, e. g. a fabric of cellulose acetate yarn will be employed with a moulding powder having a basis of cellulose acetate or a fabric of cellulose ether yarn with a moulding powder having a basis of a similar cellulose ether. We may, however, use dissimilar cellulose derivatives for the fabric and moulding powder respectively. Similarly, either the fabric or the moulding powder or both fabric and moulding powder may comprise two or more of the aforesaid cellulose derivatives. In any case, as before mentioned, the moulding powders will comprise a plasticizing agent or agents for the cellulose derivative or derivatives, and the fabrics will likewise preferably contain or be treated with a plasticizing agent or agents, and preferably the plasticizing agent or agents used in or on the fabric will likewise be plasticizing agent or agents for the cellulose derivative or derivatives of the moulding powder.

Any known plasticizing agents of the cellulose acetate or other cellulose derivatives used may be employed in the moulding powders or for the fabrics in carrying out the invention.

The manner in which the invention may be carried out in practice is illustrated by the following example, it being understood that this is in no way limitative and can be varied widely without departing from the invention.

Example: A fabric woven, knitted or otherwise formed from cellulose acetate artificial silk, is soaked in a solution comprising a plasticizing agent dissolved in a substance which is non-solvent towards cellulose acetate, for example a solution comprising 60 parts benzol and 40 parts of a plasticizing agent such as monoalkyl derivative of an aromatic sulphonamide, for instance a xylene monomethyl sulphonamide. The fabric is then dried and the desired design or pattern applied for instance by printing from blocks with solutions of dyes in volatile solvents containing a plasticizing agent. The printed fabric is then dried and cut to desired shape, and inserted in the mould box between layers of moulding powder consisting of or comprising cellulose acetate and a plasticizing agent, preferably the same plasticizing agent as that used in the solution for soaking the fabric, the moulding powder being preferably employed in a state of fine division.

Any desired number of pieces or layers of fabric may be employed in any required relative positions according to the type of article and effect it is desired to produce. The whole is then subjected to the necessary application of heat and pressure, for example in a heated hydraulic press, to give a homogeneous product containing the desired pattern. Naturally when a plurality of pieces of fabric are employed they will be inserted in appropriate relation to one another to produce the desired pattern or effect, though it is of course understood that the individual pieces of fabric may or may not each bear the same design or pattern, the design or pattern of the completed pressed article being produced from similarly or dissimilarly printed or coloured pieces of fabric placed in any desired relation or register each to the other or others.

The term "effect materials" used hereinafter in the claims is to be understood as including patterned or effect materials, sheets, slabs, blocks, or other articles or objects, while the term "substitution derivative of cellulose" is employed as signifying cellulose acetate, nitrocellulose, or methyl, ethyl or benzyl cellulose or other esters or ethers of cellulose.

What we claim and desire to secure by Letters Patent is:

1. Process for the manufacture of effect materials from moulding powders comprising a plasticizable substitution derivative of cellulose associated with a plasticizing agent, said process comprising placing in contact with the moulding powder a colored fabric composed of at least one substitution derivative of cellulose, and subjecting the whole to moulding under heat and pressure, whereby the fabric coalesces with the moulding powder.

2. Process for the manufacture of effect materials from moulding powders comprising a plasticizable substitution derivative of cellulose associated with a plasticizing agent, said process comprising placing in contact with the moulding powder a locally colored fabric composed of at least one substitution derivative of cellulose, and subjecting the whole to moulding under heat and pressure, whereby the fabric coalesces with the moulding powder.

3. Process for the manufacture of effect materials from moulding powders comprising a plasticizable substitution derivative of cellulose associated with a plasticizing agent, said process comprising placing in contact with the moulding powder a colored fabric composed of at least one substitution derivative of cellulose and likewise associated with a plasticizing agent, and subjecting the whole to moulding under heat and pressure, whereby the fabric coalesces with the moulding powder.

4. Process for the manufacture of effect materials from moulding powders comprising a plasticizable substitution derivative of cellulose associated with a plasticizing agent, said process comprising placing in contact with the moulding powder a colored fabric composed of at least one substitution derivative of cellulose and associated with a substance which is a plasticizing agent both for the basic material of the moulding powder and for the material of the fabric, and subjecting the whole to moulding under heat and pressure, whereby the fabric coalesces with the moulding powder.

5. Process for the manufacture of effect materials from moulding powders comprising a plasticizable substitution derivative of cellulose associated with a plasticizing agent, said process comprising placing between layers of the moulding powder a colored fabric composed of at least one substitution derivative of cellulose, and subjecting the whole to moulding under heat and pressure, whereby the fabric coalesces with the moulding powder.

6. Process for the manufacture of effect materials from moulding powders comprising cellulose acetate associated with a plasticizing agent, said process comprising placing in contact with the moulding powder a colored fabric composed of cellulose acetate, and subjecting the whole to moulding under heat and pressure, whereby the fabric coalesces with the moulding powder.

7. Process for the manufacture of effect materials from moulding powders comprising cellulose acetate associated with a plasticizing agent, said process comprising placing in contact with the moulding powder a locally colored fabric composed of cellulose acetate, and subjecting the whole to moulding under heat and pressure, whereby the fabric coalesces with the moulding powder.

8. Process for the manufacture of effect materials from moulding powders comprising cellulose acetate associated with a plasticizing agent, said process comprising placing in contact with the moulding powder a colored fabric composed of cellulose acetate and likewise associated with a plasticizing agent, and subjecting the whole to moulding under heat and pressure, whereby the fabric coalesces with the moulding powder.

In testimony whereof we have hereunto subscribed our names.

WILLIAM ALEXANDER DICKIE.
JAMES HENRY ROONEY.